(12) United States Patent
Harrison et al.

(10) Patent No.: US 6,442,943 B1
(45) Date of Patent: Sep. 3, 2002

(54) METHODS AND APPARATUS FOR DETECTING TURBINE ENGINE FLAMEOUT

(75) Inventors: Peter Thomas Harrison, Mason; Kail Lester Linebrink, Middletown, both of OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/859,612

(22) Filed: May 17, 2001

(51) Int. Cl.[7] ............................................... F02C 7/262
(52) U.S. Cl. ........................ 60/779; 60/803; 60/39.091
(58) Field of Search ............................. 60/779, 39.091, 60/803, 790

(56) References Cited

U.S. PATENT DOCUMENTS

| | | | |
|---|---|---|---|
| 3,830,055 A | * 8/1974 | Erlund | .................... 60/39.091 |
| 4,783,957 A | 11/1988 | Harris | |
| 5,170,621 A | 12/1992 | Barnum et al. | |
| 5,235,802 A | 8/1993 | Barnum et al. | |
| 5,551,227 A | * 9/1996 | Moulton et al. | ......... 60/39.091 |
| 5,581,995 A | * 12/1996 | Lucenko et al. | ......... 60/39.091 |
| 5,828,797 A | 10/1998 | Barnum et al. | |
| 5,961,314 A | 10/1999 | Myhre et al. | |

* cited by examiner

Primary Examiner—Ehud Gartenberg
(74) Attorney, Agent, or Firm—Wiliam Scott Andes; Armstrong Teasdale LLP

(57) ABSTRACT

A flameout detection system for an engine that facilitates detection of flameout in the engine in a cost-effective and reliable manner is described. A method implemented by the device includes the steps of detecting a rate of change of gas generator speed, also described as engine deceleration rate, and declaring a flameout if a deceleration rate of the engine is greater than a pre-determined threshold.

20 Claims, 2 Drawing Sheets

METHODS AND APPARATUS FOR DETECTING TURBINE ENGINE FLAMEOUT

BACKGROUND OF THE INVENTION

This application relates generally to gas turbine engines and, more particularly, to flameout detection systems for gas turbine engines.

Dependable detection of gas generator flameout is important in turbo jet, turbofan and gas turbine engine based power generating systems to provide a catalyst for appropriate action following a flameout. Depending on the type of engine and the application of the engine, an appropriate response action may initiate a re-lighting process of the engine. Alternatively, should a re-light be deemed hazardous, the appropriate response action may shut off the fuel supply to the engine.

At least some known flameout detection systems employ sensors on an engine specifically for flameout detection. Such sensors are used with various flameout detection systems and include ultraviolet flame detectors, combustor pressure transducers and fuel manifold pressure transducers. To detect engine flameout, a plurality of flameout detection specific sensors are coupled to the engine. The additional engine flameout specific sensors increase an overall cost and weight of the engine. Furthermore, because of engine complexity, installing additional sensors may adversely affect a reliability of the engine. In addition, using additional sensors may also introduce engine-to-engine variations in flameout detection which can lead to false indications of flameout in at least some known systems.

BRIEF SUMMARY OF THE INVENTION

In an exemplary embodiment, a flameout detection system for a gas turbine engine combustor facilitates detection of engine flameout in a cost-effective and reliable manner. More specifically, the flameout detection system detects engine flameout without the installation of additional engine sensors that are specific for engine flameout detection. Rather, the flameout detection system uses existing sensor data, such as a rate of change in gas generator speed to monitor the engine for flameout conditions.

A method for detecting gas turbine engine flameout using the system includes the steps of detecting a rate of change of gas generator speed and declaring a flameout if a deceleration rate of the engine is greater than a pre-determined threshold. As a result, the method of flameout detection using the flameout detection system is more cost-effective and reliable than other known flameout detection systems.

DETAILED DESCRIPTION OF THE INVENTION

Figure 1:
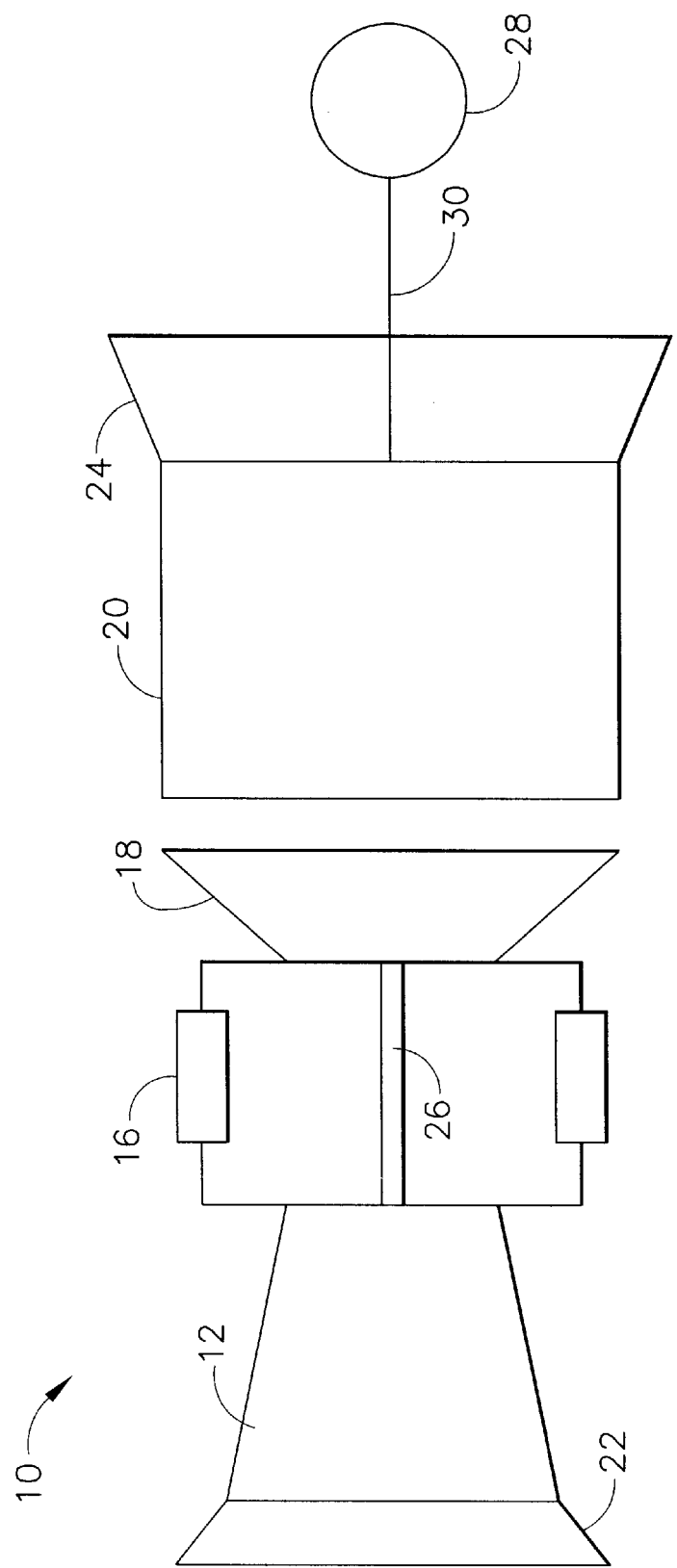
FIG. 1 is a schematic illustration of a gas turbine engine.

FIG. 1 is a schematic illustration of a gas turbine engine 10 including at least one compressor 12, a combustor 16, a high pressure turbine 18, a low pressure turbine 20, an inlet 22, and an exhaust nozzle 24 connected serially. In one embodiment, engine 10 is an LM2500+ engine commercially available from General Electric Company, Cincinnati, Ohio. Compressor 12 and turbine 18 are coupled by a first shaft 26, and turbine 20 and a driven load 28 are coupled by a second shaft 30.

In operation, air flows into engine inlet 22 through compressor 12 and is compressed. The compressed air is then delivered to combustor 16 where it is mixed with fuel and ignited. Airflow from combustor 16 drives rotating turbines 18 and 20 and exits gas turbine engine 10 through exhaust nozzle 24.

Figure 2:
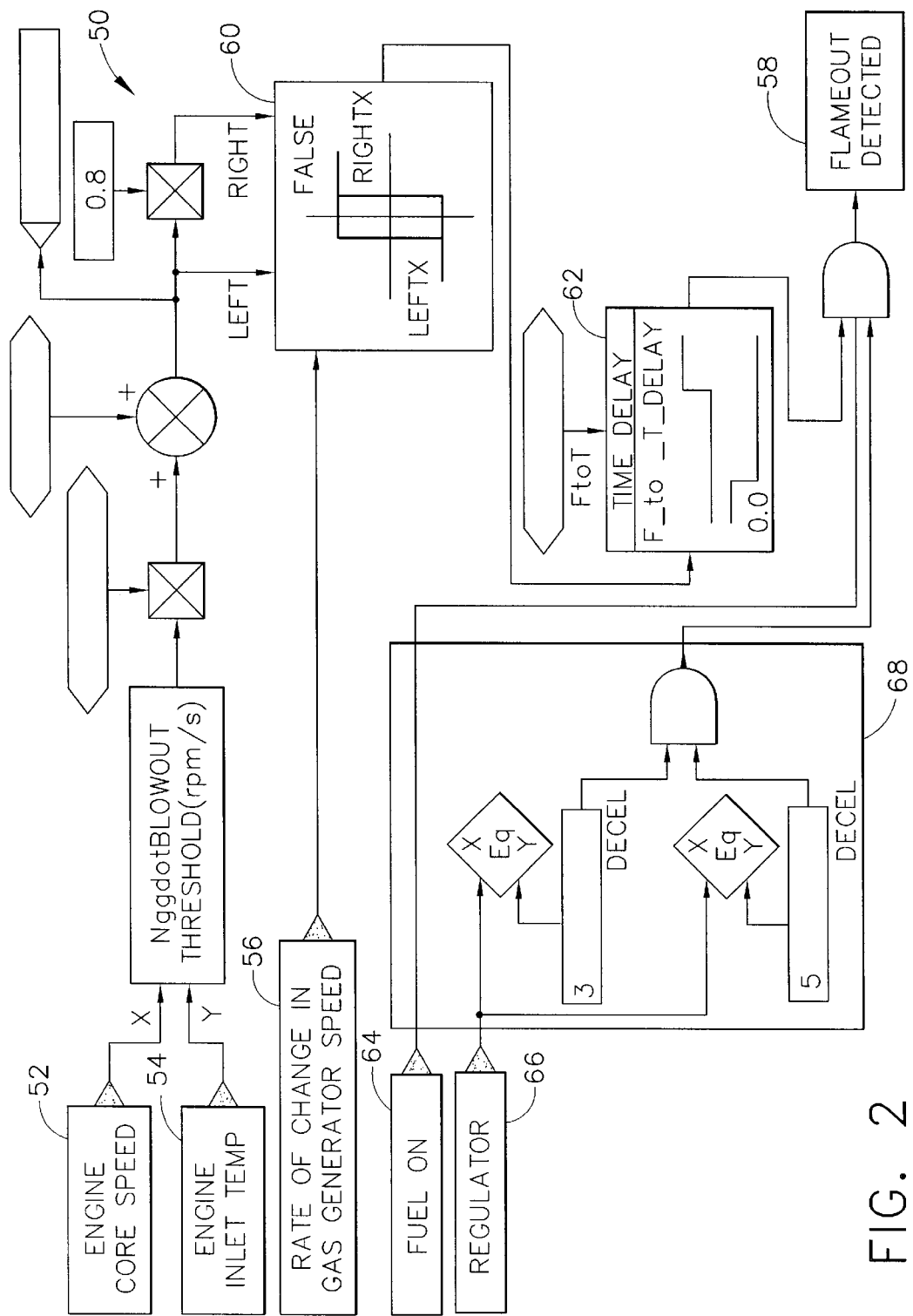
FIG. 2 is a schematic of a flameout detection system.

FIG. 2 is a schematic of a flameout detection system 50 that may be used with engine 10 (shown in FIG. 1). Alternatively, flameout detection system 50 may be used with other types of power generating systems. Flameout detection system 50 receives inputs for gas generator speed 52, engine inlet temperature 54 and a rate of change in gas generator speed 56. As shown in FIG. 2, system 50 declares that an engine flameout 58 has occurred based upon a rate of change in gas generator speed 56 (deceleration rate of the engine), and also based upon a threshold prediction 60. More specifically, threshold predication 60 is scheduled as a function of gas generator speed 52 and engine inlet temperature 54. Gas generator speed 52, engine inlet temperature 54 and rate of change in gas generator speed 56, are signals used in the art to monitor engine performance in other systems not described herein. Furthermore, system 50 uses these signals 52, 54, and 56 for flameout detection, and as such, system 50 does not require additional sensors to be installed to engine 10. The lack of additional sensors facilitates maintaining or improving a reliability of the engine as engine components do not need to be disassembled to permit additional sensors to be installed. In addition, because system 50 does not require additional sensors, engine-to-engine variations in flameout detection that may occur when additional sensors are installed within a gas turbine engine, are facilitated to be reduced, thus false flameout indications are also facilitated to be reduced or eliminated. In one embodiment, a time delay logic device 62 is implemented into system 50 to facilitate reducing any false indications that the pre-determined threshold has been satisfied.

Logic in system 50 is implemented with a threshold prediction schedule based upon engine test data. The prediction schedule is based upon deceleration rate test data of engine 10 observed during rapid decelerations and induced flameouts. In another embodiment, system 50 is configured to be disabled during normal decelerations of the engine.

Corrective action to a flameout detection, in one embodiment, includes signaling the engine control to shut fuel valves which supply fuel to the engine. In an alternative embodiment, gas turbine engine 10 is a GE90 aircraft engine, commercially available from General Electric Company, Cincinnati, Ohio, and corrective action to a flameout detection includes activating a combustor ignition system in an attempt to reignite the engine. Shutting off the fuel supply to engine 10 precludes the possibility of an explosive re-light of engine 10 or other untimely or inappropriate events when an engine flameout is indicated. In one embodiment, a fuel supply signal 64 and a fuel regulator signal 66 are input into logic 68 which uses a rate of deceleration threshold, in addition to threshold prediction 60 to determine whether an engine flameout has occurred.

The above-described flameout detection system for engines is cost-effective and reliable. The system includes logic for comparing a deceleration rate of an engine to a pre-defined threshold, and making a determination of flameout conditions, based on the comparison. The pre-defined threshold is, in one embodiment, based upon at least one of engine inlet temperature and gas generator speed. In another embodiment, a detected flameout causes a signal to be sent to a fuel shut-off valve, to prevent fuel from being sent to the engine, thereby preventing an explosive re-light of the engine. Furthermore, the above described system detects engine flameouts without using or installing additional sensors within the engine. As a result, a risk of engine weight gains from additional sensors are facilitated to be reduced or eliminated. In addition, because the detection system uses existing sensors, no special calibrations or maintenance actions are required to maintain flameout detection integrity of the system, and engine-to-engine signal variations which are known to exist in other engine flameout detection systems are also facilitated to be reduced or eliminated. As a result, the flameout detection system facilitates detecting engine flameouts in a more reliable and cost-effective manner.

While the invention has been described in terms of various specific embodiments, those skilled in the art will recognize that the invention can be practiced with modification within the spirit and scope of the claims.

What is claimed is:

1. A method for detecting gas turbine engine flameout using a flameout detection system, said method comprising the steps of:

detecting a rate of change of gas generator speed; and declaring a flameout if a deceleration rate of the engine is greater than a pre-determined threshold.

2. A method in accordance with claim 1 further comprising the step of closing fuel shut-off valves to prevent an explosive relight.

3. A method in accordance with claim 1 wherein said step of declaring a flameout further comprises the step of pre-determining the threshold as a function of gas generator speed.

4. A method in accordance with claim 1 wherein said step of declaring a flameout further comprises the step of pre-determining the threshold as a function of engine inlet temperature.

5. A method in accordance with claim 1 wherein said step of declaring a flameout further comprises the step of implementing a threshold prediction schedule based on engine test data.

6. A method in accordance with claim 5 wherein said step of implementing a threshold prediction schedule further comprises the step of observing engine test data from at least one of rapid decelerations and induced flameouts.

7. A flameout detection device for a gas turbine engine, said device comprising:

a logic device configured to compare an acquired rate of change signal of gas generator speed to a pre-determined threshold, wherein the rate of change of gas generator speed indicates engine deceleration rate; and a circuit configured to provide a signal representative of an engine flameout if the deceleration rate of the engine is greater than the pre-determined threshold.

8. A device according to claim 7 further comprising logic configured to provide a signal to close fuel shut-off valves to prevent an explosive relight.

9. A device according to claim 7 further comprising a gas generator speed input, said device configured to determine the pre-determined threshold as a function of gas generator speed.

10. A device according to claim 7 further comprising an engine inlet temperature input, said device configured to determine the pre-determined threshold as a function of engine inlet temperature.

11. A device according to claim 7 further comprising logic to implement a threshold prediction schedule based on engine test data.

12. A device according to claim 11 wherein said logic implements a threshold prediction schedule based upon engine test data from at least one of rapid decelerations and induced flameouts.

13. A device according to claim 7 further comprising logic to delay an indication of engine flameout after said logic device indicates the pre-determined threshold has been met.

14. A gas turbine engine comprising a flameout detection device, said device comprising:

a logic device configured to compare an acquired rate of change signal of gas generator speed to a pre-determined threshold wherein the rate of change of gas generator speed indicates engine deceleration rate; and a circuit configured to provide a signal representative of an engine flameout if the deceleration rate of the engine is greater than the pre-determined threshold.

15. A gas turbine engine in accordance with claim 14 wherein said flameout detection device further comprises logic configured to provide a signal to close fuel shut-off valves to prevent an explosive re-light.

16. A gas turbine engine in accordance with claim 14 wherein said flameout detection device further comprises a gas generator speed input, said device configured to determine the pre-determined threshold as a function of gas generator speed.

17. A gas turbine engine in accordance with claim 14 wherein said flameout detection device further comprises an engine inlet temperature input, said device configured to determine the pre-determined threshold as a function of engine inlet temperature.

18. A gas turbine engine in accordance with claim 14 wherein said flameout detection device further comprises logic to implement a threshold prediction schedule based on engine test data.

19. A gas turbine engine in accordance with claim 18 wherein said logic implements a threshold prediction schedule based upon engine test data from at least one of rapid decelerations and induced flameouts.

20. A gas turbine engine in accordance with claim 14 wherein said flameout detection device further comprises logic to delay an indication of engine flameout after said logic device indicates the pre-determined threshold has been met.

* * * * *

UNITED STATES PATENT AND TRADEMARK OFFICE
CERTIFICATE OF CORRECTION

PATENT NO. : 6,442,943 B1
DATED : September 3, 2002
INVENTOR(S) : Harrison et al.

Page 1 of 1

It is certified that error appears in the above-identified patent and that said Letters Patent is hereby corrected as shown below:

Column 3,
Line 49, delete "ratc" and insert therefor -- rate --.

Signed and Sealed this

Twelfth Day of October, 2004

JON W. DUDAS
*Director of the United States Patent and Trademark Office*